S. H. HARRINGTON.
SEMAPHORE SIGNAL.
APPLICATION FILED SEPT. 9, 1903. RENEWED DEC. 14, 1905.
911,588.
Patented Feb. 9, 1909.
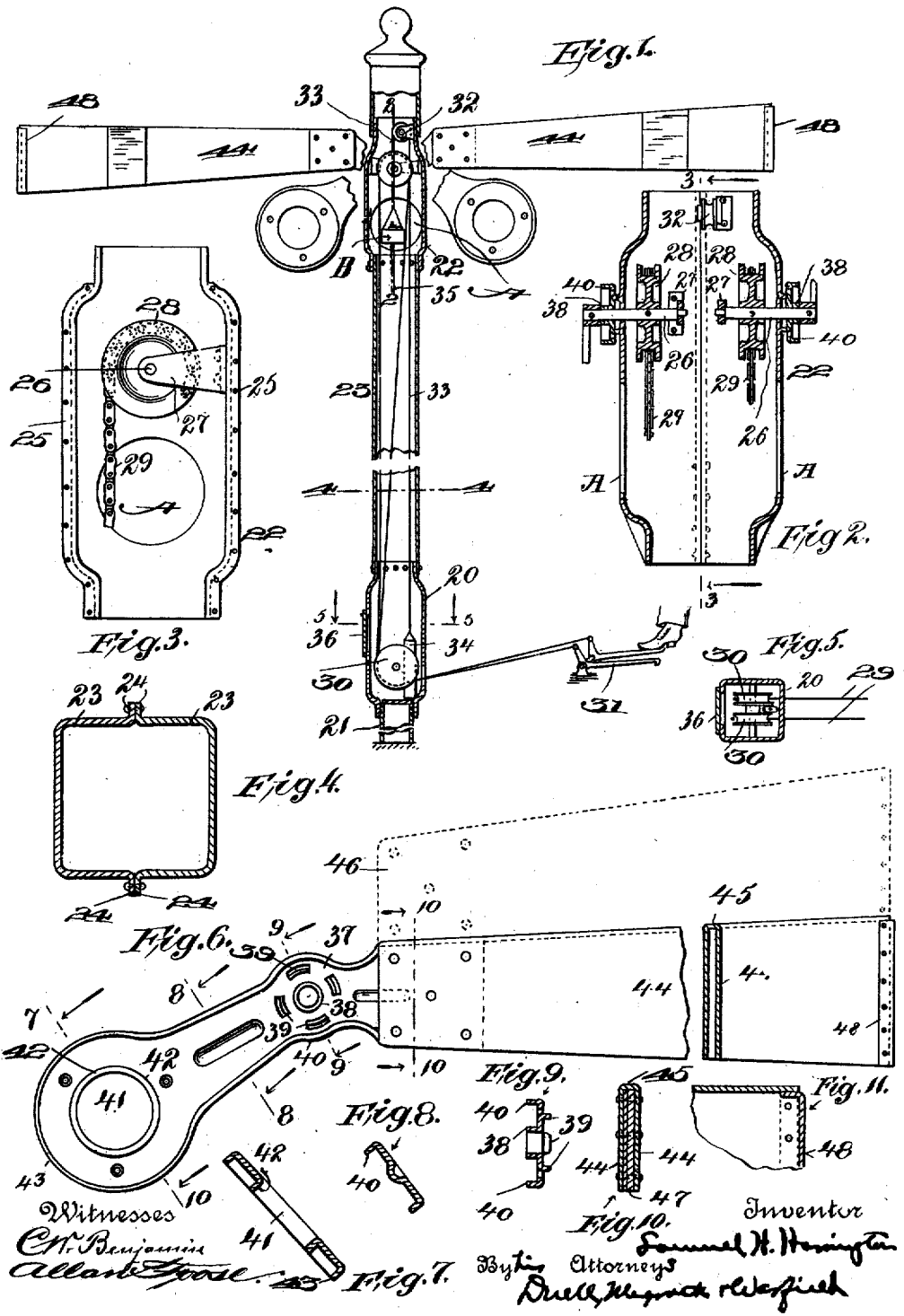

UNITED STATES PATENT OFFICE.

SAMUEL H. HARRINGTON, OF NEW YORK, N. Y., ASSIGNOR TO WILLIAM C. WILSON, OF NYACK, NEW YORK.

SEMAPHORE-SIGNAL.

No. 911,588.      Specification of Letters Patent.      Patented Feb. 9, 1909.

Application filed September 9, 1903, Serial No. 172,427. Renewed December 14, 1905. Serial No. 291,785.

*To all whom it may concern:*

Be it known that I, SAMUEL H. HARRINGTON, residing at New York, in the county of New York and State of New York, have invented certain new and useful Improvements in Semaphore-Signals, of which the following is a full, clear, and exact description, such as will enable others skilled in the art to which it appertains to make and use the same.

This invention relates to semaphore signals. Its object, in general, is to improve the construction of the semaphore frame or arm, to provide an efficient and economical means for actuating the signal and a convenient and economical method of mounting and supporting the actuating mechanism.

Further objects and advantages will be in part obvious from the following description and in part pointed out.

The invention consists in the features of construction, combinations of elements and arrangement of parts which will be hereinafter fully described and the novel features thereof pointed out in the claims.

In the accompanying drawings, Figure 1 is a view, partly in elevation and partly in vertical section, of a semaphore post with a double-blade signal and actuating mechanism therefor. Fig. 2 is a section of the post on the line 2—2 of Fig. 1. Fig. 3 is a section on line 3—3 of Fig. 2, looking in the direction of the arrows. Fig. 4 is a section on line 4—4 of Fig. 1. Fig. 5 is a section on the line 5—5 of Fig. 1, looking in the direction of the arrow. Fig. 6 is a side elevation on an enlarged scale of the semaphore frame, with an indication in dotted lines of the method of forming the blade. Figs. 7 to 11 are sections through the semaphore frame on the corresponding lines, showing the formation thereof.

Similar reference characters refer to similar parts throughout the several views.

As shown in Fig. 1, a base casing or housing 20 is supported on a ground pipe 21 and is connected to an upper casing or housing 22 by a hollow post or support of which the two casings may be said to be continuations and to form parts. This central part of the post between the two casings is preferably formed, as shown, of channel sections 23, 23, having outwardly extending vertical flanges 24, 24, by which the two sections may be secured together. These sections, of which there may be a greater number than that indicated, are preferably formed of steel plate rolled or pressed into shape, thus forming a very strong and economical support and inclosing casing for the actuating mechanism of the signal. The upper casing is preferably formed in sections, as indicated, having vertical flanges 25 which are laid together and riveted or otherwise secured in assembling. In the wall of each of these sections is provided a bearing for a short semaphore shaft 26 and each section carries also a bracket 27. These brackets are provided with bearings in line with the bearings in the walls of the casing for the inner ends of the semaphore shafts. A pulley 28 is secured to each one of the shafts 26, and chains 29 connected to said pulleys, as by pinning the ends of the chains to the periphery of the pulleys, pass over said pulleys and down adjacent the inner wall of the post, the shaft bearings in the upper casing being located near one of the side walls thereof. Obviously any suitable flexible connection as cable, rope or otherwise could be substituted as full equivalent of the chain illustrated and the term chain is used to cover broadly such flexible connection. On a pivot shaft in the lower casing are located two idler pulleys 30, 30 over which the chains 29 pass and from which they are led through openings in the sides of the casing, to a point outside the casing where they may be actuated as by suitable treadle levers 31.

In the front and side walls of the casing, one or both, there may be located transparent sections A of any suitable material. Within the upper casing is mounted a pulley 32 preferably at a point above the plane of the semaphore shafts and on a line passing between the two, as shown. Over this pulley passes a cord 33, one end of which is connected to an oil pot B and the other end to a counterweight 34. A pull-down cord 35 connected to the lower side of the oil pot enables it to be brought down into the lower casing to the level of a door 36 where it may be readily cleaned and attended to, the counterweight holding it normally in the position shown in Fig. 1 in registry with the transparent sections in the walls of the casing. The position of the semaphore shafts at one side of the casing allows the chains to pass down at one side of the post where they will not interfere with the free movement of the oil pot.

The semaphore frames or arms are alike and a description of one will suffice for both, it being understood that they are secured upon the ends of the shafts 26, as best shown in Fig. 2, on the outside of the casing for movement therewith. So far as the use of the term shaft in the specification and claims is concerned it is immaterial whether the semaphore arm moves with the shaft or on it. Details of construction of the arm are best shown in Fig. 6 and the sections thereof. The entire semaphore arm is preferably in one piece, and stamped, pressed or otherwise formed of a single plate of light yet strong material, as steel. What may be termed the main frame or member, as at 37, has a hub 38, by which it may be mounted on the semaphore shaft, struck up therefrom at one side, while at the other side there are struck up a series of supplementary steadying pieces or supports 39 adapted to engage the side of the upper casing 22 when the signal is in position thereby providing an increased bearing surface for the signal to compensate for the pressure of the wind thereagainst and to prevent friction or binding upon the actuating shaft which might detract from the necessary easy and certain movement thereof. While there are preferably a series of these members there might be one or more to any extent. Side webs or flanges 40 may also be struck up from the main web for purposes of stiffening and strength. The counterweight end of the frame may be of any desired shape, but preferably has a central aperture, as at 41, surrounded by a flange 42 such that there is provided a socket between the flange 42 and the outer flange 43, within which socket a counterweight block may be secured if desired. The semaphore blade is preferably formed, as shown, of inverted U-shape, having side walls 44, 44 separated a short distance from each other and joined by an upper wall 45, the lower edge being open. The preferable method of forming the blade in this shape is by first forming a wide plate substantially twice the width which is described for the blade, said blade being integral with the frame for a part only of its width, and then turning down the part extending above the frame, as shown by the dotted lines at 46, into its final shape, as shown. For purposes of stiffening and strength it is preferable that there should be interposed between the side walls at a point near the frame a filler block 47 of wood or other material. A filler piece 48 may also be secured at the end of the blade between the two walls, both for the purposes of completing the inclosure of the top and sides of the blade and for stiffening.

It will be seen that the described construction provides a very light, economical, easily formed semaphore, which is yet sufficiently stiff to withstand the action of the wind and strains to which it is subjected. It will be seen that the U-shaped construction of the blade is desirable also since the space inclosed thereby may be readily utilized by inserting from beneath, lights, resistance coils and the like, commonly used in connection with such signals.

The fact which is especially applicable to inventions of this character will be readily apparent to those acquainted with this art, that various changes in form and position of elements and in the manner of assembling various elements may be made which might materially change the appearance of the signal and associated parts without varying the principle or departing from the scope of this invention.

Such novel features of invention as are shown but not claimed herein are intended to be claimed in a companion application for semaphore signal of even date with this application.

Having described my invention, what I claim as new and desire to secure by Letters Patent is:—

1. A semaphore frame having a shaft bearing therein and a supplementary steadying member struck up from said frame.

2. A semaphore frame having a shaft bearing therein and a series of supplementary steadying members struck up from said frame.

3. A semaphore frame having a shaft bearing therein and a supplementary steadying member struck up from said frame adjacent said shaft bearing.

4. A semaphore frame having an integral hub forming a shaft bearing struck up on one side thereof and a series of supplementary steadying members struck up on the other side of said frame.

5. A one-piece semaphore frame having a counterweight arm and a blade arm, said blade arm being of U-shape in cross section.

6. A one-piece semaphore frame having a counterweight arm and a blade arm, said blade arm being of inverted U-shape in cross section.

7. A one-piece semaphore blade of U-shape in cross section.

8. A one-piece metallic semaphore blade of U-shape in cross section.

9. A one-piece metallic semaphore blade of inverted U-shape in cross section.

10. A semaphore blade of U-shape in cross section and having a filler block interposed between the sides thereof.

11. A metallic semaphore blade of U- shape in cross section and having a filler block interposed between the sides thereof.

12. A metallic semaphore blade of U-shape in cross section and having a filler block at the outer end of the blade.

13. A semaphore frame provided with a U-shaped blade, with a filler block interposed between the sides of said blade at the point where the frame is connected thereto, and a second filler block near the outer end of said blade.

14. A semaphore frame provided with a blade of inverted U-shape in cross section, one of the side walls of said U being integral with said frame.

15. A one-piece semaphore frame provided at one end with a counterweight arm and at the other end with a blade of U-shape in cross section, one of the side walls of said U being integral with said frame.

16. A one-piece semaphore frame provided at one end with a counterweight arm and at the other end with a blade of inverted U-shape in cross section, one of the sides of said U being integral with the main frame.

17. In a semaphore signal, in combination, a central supporting post composed of sections of formed steel plates provided with vertical flanges by which the edges of adjacent sections may be connected, a casing at the top of said post, a semaphore arm mounted on the outside of said casing for movement relative thereto, means inclosed within said casing for so moving said arm, and actuating connections for said moving means extending down through said post.

18. In a semaphore signal, in combination, a central supporting post comprised of sections of formed steel plates provided with vertical flanges by which the edges of adjacent sections may be connected, a casing at the top of said post, a semaphore arm mounted on the outside of said casing for movement relative thereto, means inclosed within said casing for so moving said arm, a lower or base casing at the bottom of said post, actuating connections for said moving means extending down through said post and into said lower casing, and means for applying power to said actuating means from the outside of said casing.

19. In a semaphore signal, in combination, a casing, a shaft mounted in bearings therein, a semaphore arm mounted on said shaft for movement relative to said casing, a transparent section in the side of said casing, a pulley mounted in said casing independently of said shaft, a cord passing over said pulley, a counterweight connected to one end and a light supplying means to the other end of said cord.

20. A casing adapted to be included as part of a semaphore post, said casing being made up of connected sections, each of said sections being provided with a bearing in the wall thereof and a bracket carrying a second bearing in line with the first.

21. A casing adapted to be included as part of a semaphore post, said casing being built up of connected sections, each section having formed therein a bearing for one end of a semaphore shaft and carrying a bracket provided with a bearing for the other end of said shaft, a shaft mounted in said bearings, a pulley mounted on said shaft within the casing and a semaphore arm mounted on said shaft without the casing.

22. In a semaphore signal, in combination, a hollow post, an upper casing supported thereon, said casing being provided with bearings formed in the walls thereof and supplementary bearings carried by brackets in line with each of said first bearings, a shaft carried by each set of bearings, semaphore arms on said shafts, pulleys connected to said shafts on the inside of the casing, chains connected to said pulleys and passing down through the hollow post, a base casing at the lower end of said post, idler pulleys mounted in said base casing corresponding to the shaft pulleys and openings in said base casing through which the ends of said chains may be led out and means for applying power to said chains outside of said casing.

23. In a double-blade semaphore signal, in combination, a hollow post provided with a casing at its upper and lower ends respectively, a light supplying means mounted for movement up and down within said post, shafts carried by said upper casing near one side thereof, semaphore arms carried by said shafts and connections for actuating said shafts extending to the lower casing adjacent the inner wall of said post at one side of the line of movement of said light supplying means.

24. A semaphore blade of U-shape in cross-section.

25. A semaphore blade, of inverted U-shape in cross section.

26. In signaling apparatus, means supporting a semaphore arm and adapted to swing about an axis, and comprising a member extending on the side of said axis away from the semaphore arm, said member being formed of sheet metal of substantially equal thickness throughout and provided with a strengthening flange about its peripheral edge.

27. In signaling apparatus, in combination, means supporting a semaphore arm and adapted to swing about an axis, and comprising a member extending on the side of said axis away from the semaphore arm, said member being provided with a flange about its edge, and a counterweight secured within said flange.

28. In signaling apparatus, in combination, means supporting a semaphore arm and adapted to swing about an axis, and comprising a member extending on the side of said axis away from the semaphore arm, said member being formed of sheet metal of substantially equal thickness throughout, and provided with a strengthening flange about its peripheral edge, and a counterweight secured to said member within said flange.

29. In signaling apparatus, in combination, means supporting a semaphore arm and adapted to swing about an axis, and comprising a member extending on the side of said axis away from the semaphore arm, said member being formed of sheet metal and provided with a strengthening flange about its edge and having an opening formed therein, and a member secured to said first member at the portions thereof about said opening.

In testimony whereof I affix my signature, in the presence of two witnesses.

SAMUEL H. HARRINGTON.

Witnesses:
J. B. KNOX,
L. B. STREVELL.